US010464374B1

(12) United States Patent
Jolley

(10) Patent No.: US 10,464,374 B1
(45) Date of Patent: Nov. 5, 2019

(54) ZERO-TURN LAWN-MOWER WITH CONTROLLABLY RESTRICTABLE MOVEMENTS OF FRONT WHEELS

(71) Applicant: Chapman Jolley, Decatur, TN (US)

(72) Inventor: Chapman Jolley, Decatur, TN (US)

( * ) Notice: Subject to any disclaimer, the term of this patent is extended or adjusted under 35 U.S.C. 154(b) by 0 days.

(21) Appl. No.: 16/448,095

(22) Filed: Jun. 21, 2019

(51) Int. Cl.
*B60B 33/02* (2006.01)
*A01D 34/86* (2006.01)
*A01D 75/28* (2006.01)
*B60B 33/00* (2006.01)
*A01D 101/00* (2006.01)

(52) U.S. Cl.
CPC .......... *B60B 33/026* (2013.01); *A01D 34/86* (2013.01); *A01D 75/28* (2013.01); *B60B 33/0039* (2013.01); *A01D 2101/00* (2013.01); *B60B 33/0049* (2013.01); *B60B 33/0068* (2013.01)

(58) Field of Classification Search
CPC ...... B60B 33/026; A01D 34/86; A01D 75/28; A01D 34/74; A01D 34/475; A01D 34/6806
See application file for complete search history.

(56) References Cited

U.S. PATENT DOCUMENTS

| 3,336,052 A | * | 8/1967 | Johnston | A01D 67/00 280/472 |
| 3,465,505 A | * | 9/1969 | Krinke | A01D 75/28 56/320.1 |
| 5,288,091 A | * | 2/1994 | Deschamps | B62D 7/15 180/409 |

* cited by examiner

*Primary Examiner* — Faye M Fleming
(74) *Attorney, Agent, or Firm* — Sanchelima & Associates, P.A.; Christian Sanchelima; Jesus Sanchelima

(57) ABSTRACT

A Zero-turn lawn-mower that selectively restricts movement of front wheels to achieve controlled movement while on slope is disclosed herein. Lawn-mower includes a mower frame, at least one front wheel disposed underneath mower frame, at least one cam, an actuating rod and a dawg. The cam is fixedly connected to mower frame and in the vicinity of front wheel and is further defined with a notch. Actuating rod of said lawn mower is swivelably connected to mower frame and operable by a driver, typically by a rod pedal. Dawg extends from actuating rod to selectively engage with notch to restrict angular movement of front wheel and selectively disengage from notch to enable angular movement of front wheel. This provides the user to control drift of the mower on an angled or inclined surface. Furthermore, A spring is provided at other end of pedal to reduce tension and provide smooth rotation of actuation rod.

7 Claims, 4 Drawing Sheets

ZERO-TURN LAWN-MOWER WITH CONTROLLABLY RESTRICTABLE MOVEMENTS OF FRONT WHEELS

BACKGROUND OF THE INVENTION

1. Field of the Invention

The present invention relates to lawn-mowers. More particularly, the present invention relates to a zero-turn lawn-mower with controllably restrictable movements of front wheels.

2. Description of the Related Art

Zero-turn lawn-mowers have effectively zero turning radius and while driving down or along the slope there are uncontrolled turning movements of front wheels and hence lawn mowers are difficult to control. Hence, there is a need to control uncontrolled turning and speed movements of a lawn-mower while driving down or along the slope.

Several designs for various lawn-mowers have been designed in the past. None of them, however, includes a lawn-mower in which turning movements of one or both front wheels is/are restricted to achieve controlled movements of lawn-mower while driving down or along the slope.

Applicant believes that a related reference corresponds to a US patent application 20130305675 filed by Marco Pare for a mower for steep slope, tight area and ditch mower. The Marco reference discloses a device for a mower that can easily and safely be lifted off the mowing surface without strain or damage. However, the device is silent for providing controlled turning movements while moving down the slope.

Another related application is US patent application number 20110147108 by Hecht Sr Michael Rudolf and Arthur Leon Evans for a four-wheel drive, zero-turn radius mower. The patent application 20110147108 discloses a mower system that allows operators to mow with great maneuverability and safely on uneven and/or wet terrain. However, the system requires connection with front wheels and rear wheels thus making the system more complex.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a zero-turn lawn-mower that selectively restricts turning movements and speed of front wheels to achieve controlled movements while on a slope.

It is yet another object of the present invention to provide a zero-turn lawn-mower that includes a cam mounted on each front wheel and a corresponding dawg extending from an actuating rod that is selectively operated by a rod pedal to allow or restrict turning movement of front wheels.

It is still another object of the present invention to provide a zero-turn lawn-mower that has a simple mechanism for restricting front wheels by application of force to achieve straight ahead wheel direction.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
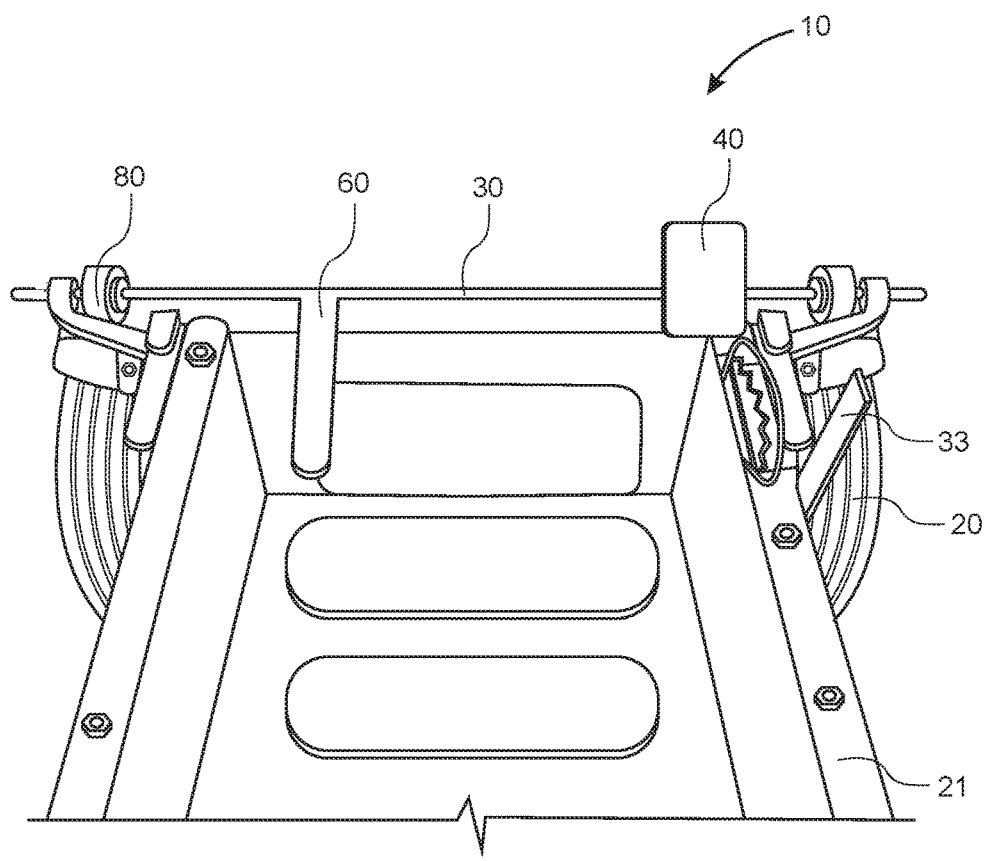
FIG. 1 represents a perspective top view of a lawn-mower 10, in accordance with one embodiment of the present disclosure, includes a mower frame 21, front wheels 20, an actuating rod 30 and a rod pedal 60.
Figure 2:
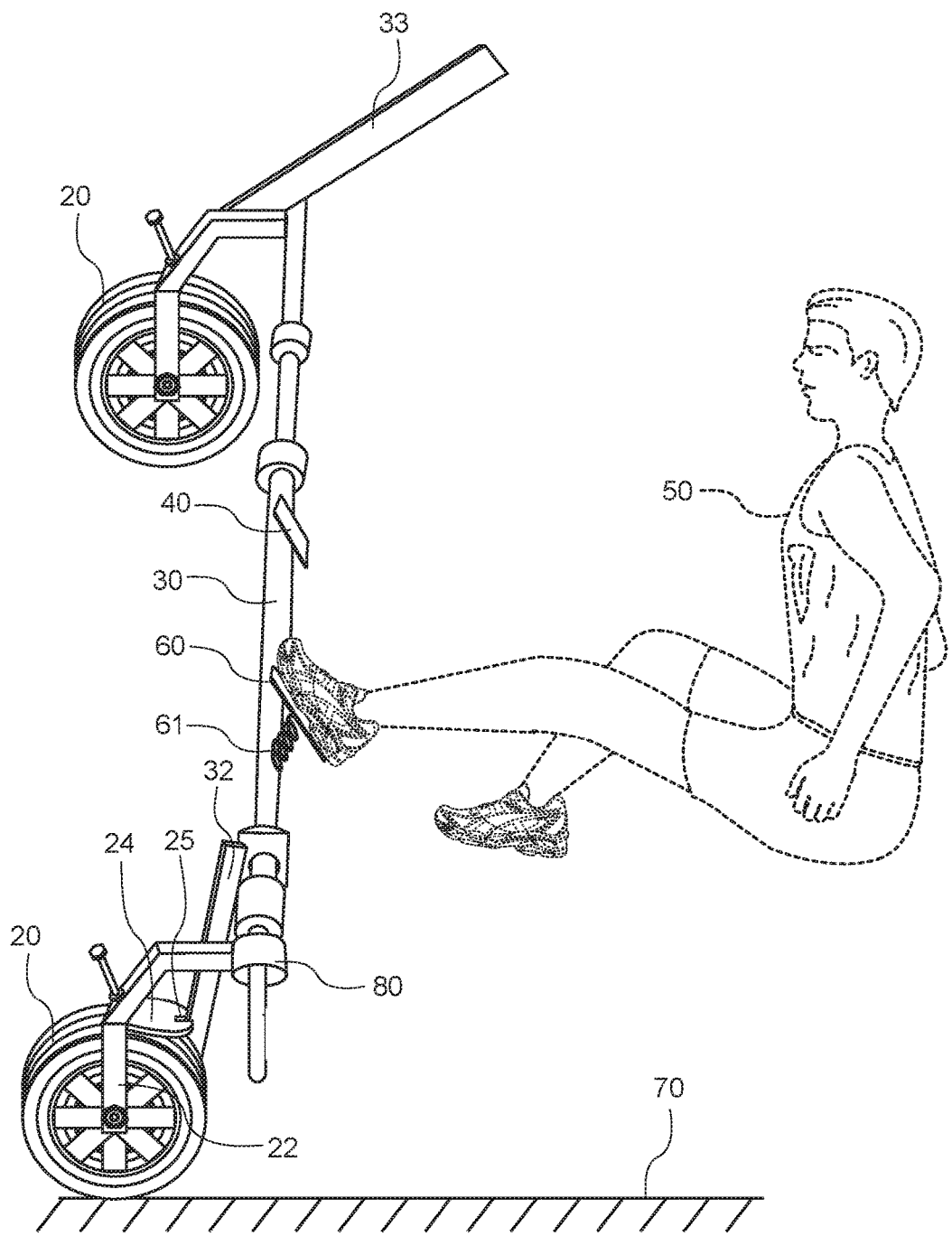
FIG. 2 represents a schematic representation of a driver 50 operating rod pedal 60 to controllably restrict turning movements of front wheels 20.
Figure 3:
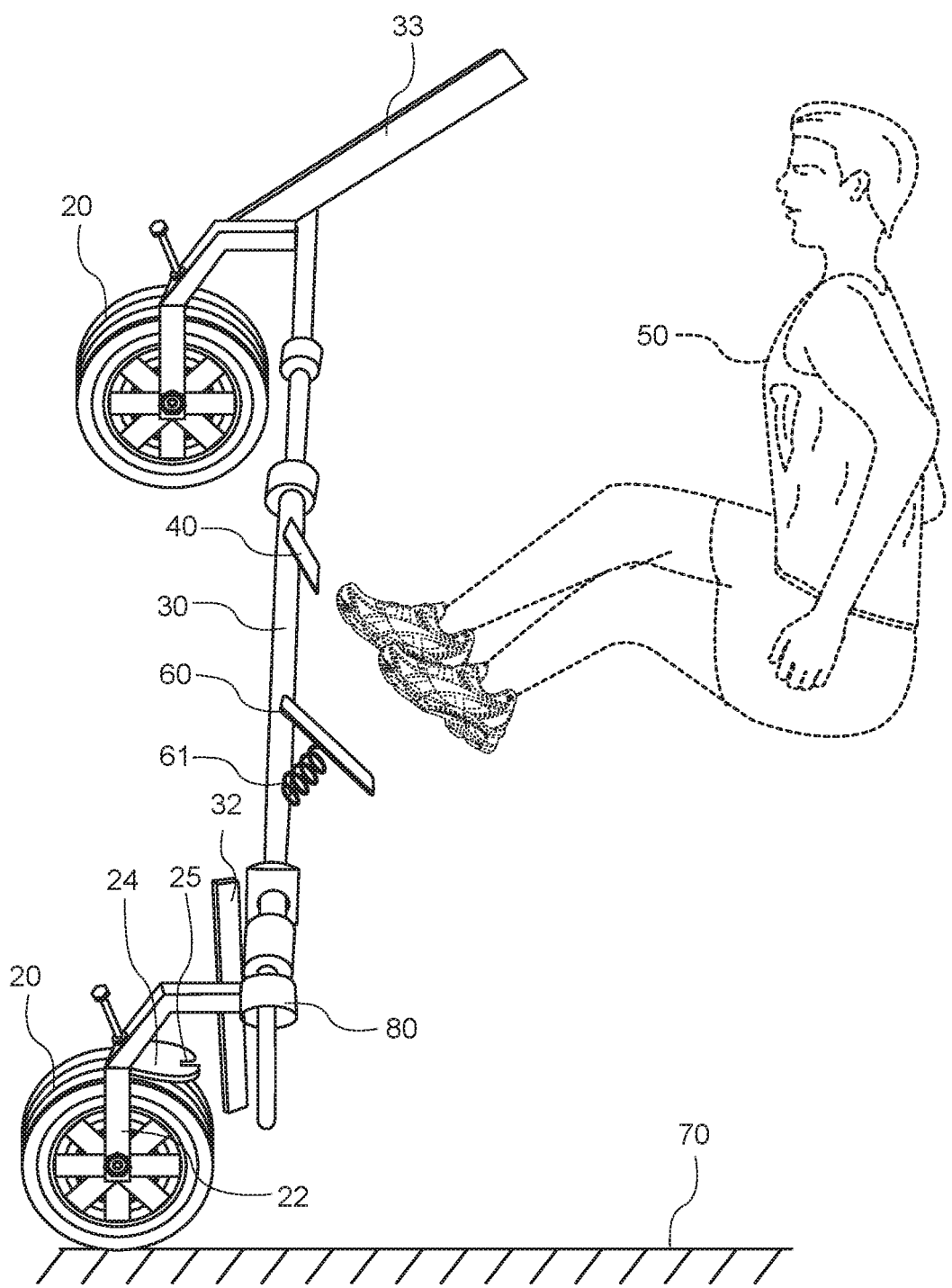
FIG. 3 represents a schematic representation of driver 50 releasing rod pedal 60 to enable turning movements of front wheels 20.
Figure 4:
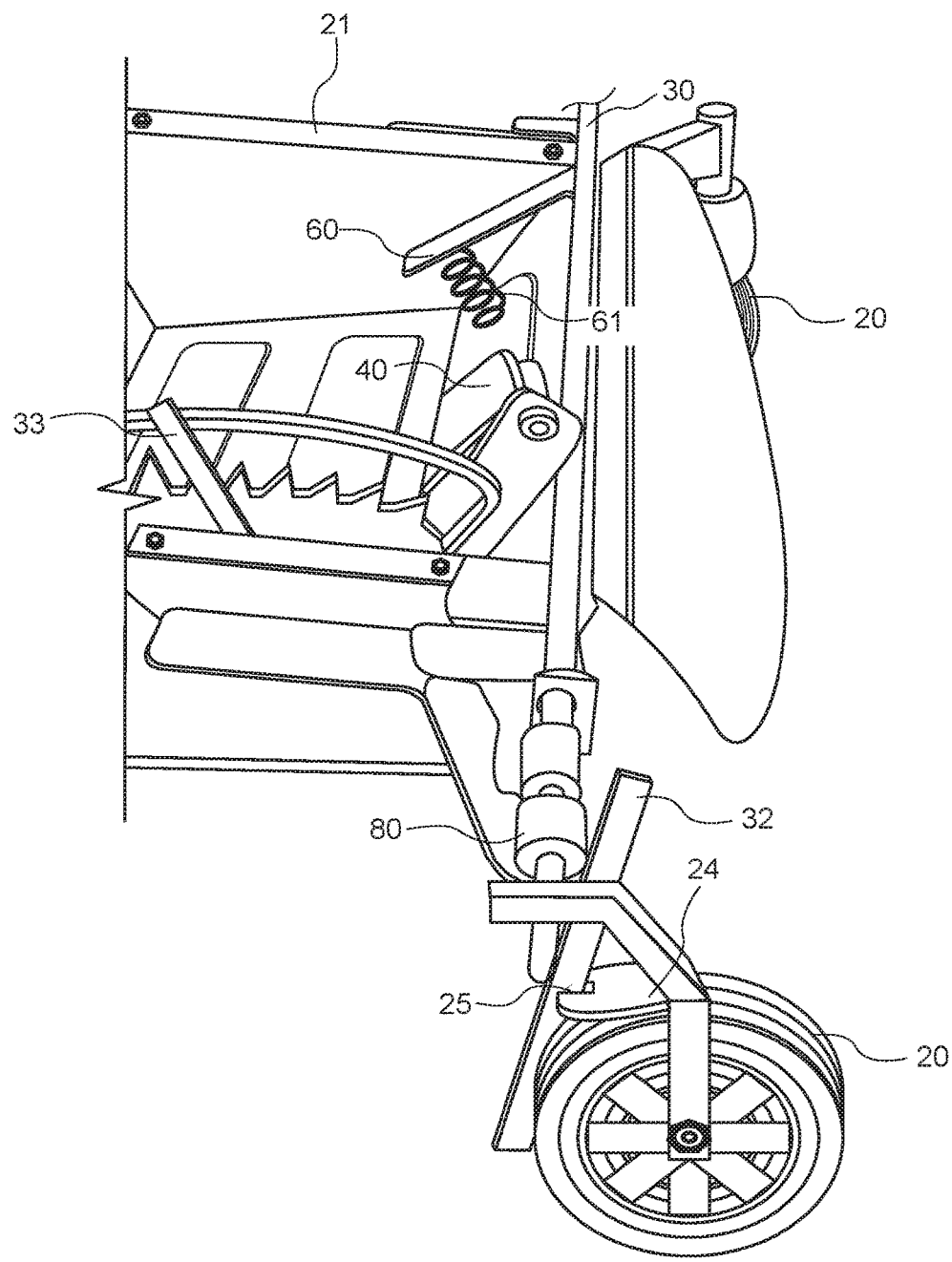
FIG. 4 represents a perspective side view of lawn-mower 10.

Referring now to the drawings, FIGS. 1-4, where the present invention is generally referred to with numeral 10, it can be observed that a lawn-mower 10, in accordance with one embodiment, is provided that mainly includes a mower frame 21, at least one front wheel 20, at least one cam 24, an actuating rod 30 and a dawg 32.

Mower frame 21 supports the components of lawn mower 10. Mower frame 21 can be a single unit or a number of components joined with each other to form a single unit. Mower frame 21 includes a wheel frame 22 and supports front wheel 20, cam 24, actuating rod 30 and dawg 32.

As illustrated, a pair of front wheels 20 is connected to frontal portion of mower frame 21. Front wheels 20 are fitted to rotate in wheel frame 22. Front wheels 20 are connected to mower frame 21 such that front wheels 20 can enable zero turn of mower frame 21 as front wheels 20 are not connected to the engine (not illustrated in Figures) of lawn-mower 10.

Cain 24 is connected to wheel frame 22 and in vicinity of front wheel 20. In one embodiment, cam 24 is connected to wheel frame 22 by a weld joint, a fastener or a clamp. Cam 24 is defined with a notch 25.

Actuating rod 30 is swivelably connected to mower frame 21 and operable by a driver 50. As depicted, actuating rod 30 is positioned in internal frontal portion of mower frame 21. In one embodiment, actuating rod 30 is rotated by a rod pedal 60 operated by a leg of driver 50. Rod pedal 60 can be selectively pressed and released by driver 50. Either one rod pedal 60 can be provided or two rod pedals 60 can be provided that can be operated by both the legs.

In another embodiment, actuating rod 30 can be operated by hand of driver through use of a hand lever (not illustrated in Figures). In another embodiment, actuating rod 30 can be operable by hand as well as leg of driver 50 by providing necessary mechanisms. In still another embodiment, hydraulic or pneumatic mechanism can be provided for operating actuating rod 30. Such hydraulic or pneumatic mechanism can be actuated by a push button (not illustrated in Figures). Actuating rod 30 is supported by bearings 80 on either side to enable rotation.

Dawg 32 extends from actuating rod 30. Dawg 32 selectively engages with notch 25 and selectively disengages from notch 25. In one embodiment, a hand lever 33 is provided that locks dawg 32 when engaged in notch 25.

In one embodiment, at least one spring 61 is disposed between the internal portion of wheel frame 22 and rod pedal 60 projecting from actuating rod 30.

In operation, when driver 50 wishes to prevent rotation/turning movement of front wheel 20, driver 50 presses rod pedal 60. When rod pedal 60 is pressed, actuating rod 30 is rotated in a first direction and dawg 32 is pushed to slide so that dawg 32 is introduced in notch 25 of cam 24. Engagement of dawg 32 in notch 25 restricts turning movement of front wheel 20 so that only straight-ahead position of front wheel 20 is achieved to allow movement in straight direction only. When driver 50 releases rod pedal 60, actuating rod 30 is rotated in a second direction, opposite to the first direction. Upon rotation of actuating rod 30 in second direction, actuating rod 30 releases pressure on dawg 32 and allowing spring 61 to retract dawg 32. When dawg 32 is retracted, dawg 32 is disengaged from notch 25 allowing front wheels 20 to rotate in all directions on ground 70.

Typically, when lawn-mower 10 moves in downward or horizontal direction of a slope, rod pedal 60 is to be pressed so that front wheels 20 are restricted to rotate thereby restricting undesired turning movement of lawn-mower 10. Rod pedal 60 can be released thereafter so that turning movement of lawn-mower 10 is possible.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A zero-turn lawn-mower comprising:
   a mower frame;
   at least one front wheel rotatably disposed underneath said mower frame;
   at least one cam fixedly connected to said wheel frame and in the vicinity of said front wheel, said cam defined with a notch;
   an actuating rod swivelably connected to said mower frame and operable by a driver; and
   a dawg extending from said actuating rod to selectively engage with said notch to restrict angular movement of said front wheel and selectively disengage from said notch to enable angular movement of said front wheel.

2. The mower as claimed in claim 1, wherein said cam and said wheel frame are connected by a weld joint, a fastener or a clamp.

3. The mower as claimed in claim 1, wherein said actuating rod is operable by a hand or a leg of the driver.

4. The mower as claimed in claim 1, wherein said actuating rod is operated by a rod pedal.

5. The mower as claimed in claim 3, further comprises at least one spring disposed between said rod pedal and said mower frame.

6. The mower as claimed in claim 1, further comprises a hand lever for locking said dawg in said notch.

7. A zero-turn lawn-mower comprising:
   a mower frame;
   at least one front wheel rotatably disposed underneath said mower frame;
   at least one cam fixedly connected to said wheel frame and in the vicinity of said front wheel, said cam defined with a notch, said cam and said wheel frame being connected by a weld joint, a fastener or a clamp;
   an actuating rod swivelably connected to said mower frame and operable by a driver, wherein said driver operates said actuating rod by use of a leg that operates on a rod pedal or by a hand;
   a dawg extending from said actuating rod to selectively engage with said notch to restrict angular movement of said front wheel on an angled or inclined surface and selectively disengage from said notch to enable angular movement of said front wheel using said rod pedal;
   at least one spring disposed between said rod pedal and said mower frame; and
   a hand lever for locking said dawg in said notch.

* * * * *